US011750874B2

(12) United States Patent
Aher et al.

(10) Patent No.: US 11,750,874 B2
(45) Date of Patent: Sep. 5, 2023

(54) SYSTEMS AND METHODS FOR PROVIDING PERSONALIZED ACTIONABLE ITEMS FOR CONTENT ITEMS

(71) Applicant: Rovi Guides, Inc., San Jose, CA (US)

(72) Inventors: Ankur Anil Aher, Maharashtra (IN); Charishma Chundi, Andhra Pradesh (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/462,337

(22) Filed: Aug. 31, 2021

(65) Prior Publication Data

US 2021/0400332 A1     Dec. 23, 2021

Related U.S. Application Data

(63) Continuation of application No. 16/861,768, filed on Apr. 29, 2020, now Pat. No. 11,140,434.

(51) Int. Cl.
*H04N 21/431* (2011.01)
*H04N 21/45* (2011.01)
*H04N 21/472* (2011.01)
*H04N 21/84* (2011.01)

(52) U.S. Cl.
CPC ..... *H04N 21/4312* (2013.01); *H04N 21/4532* (2013.01); *H04N 21/472* (2013.01); *H04N 21/84* (2013.01)

(58) Field of Classification Search
CPC .............. H04N 21/4312; H04N 21/84; H04N 21/4532; H04N 21/472
See application file for complete search history.

(56) References Cited

U.S. PATENT DOCUMENTS

| 7,761,892 B2 | 7/2010 | Ellis et al. |
| 7,904,924 B1 * | 3/2011 | de Heer ............. H04N 21/4661 705/347 |
| 8,046,801 B2 | 10/2011 | Ellis et al. |
| 9,420,319 B1 * | 8/2016 | Story, Jr. ............ H04N 21/4223 |

(Continued)

FOREIGN PATENT DOCUMENTS

EP     3273684 A1     1/2018

OTHER PUBLICATIONS

International Search Report and Written Opinion for PCT/US2020/067182 dated Mar. 11, 2021.

*Primary Examiner* — Fernando Alcon
(74) *Attorney, Agent, or Firm* — Haley Guiliano LLP

(57) ABSTRACT

The methods and systems described herein provide personalized action items for content items. In one example, the methods and systems identify a plurality of content items, each of which is associated with at least one respective attribute. The system accesses profile information associated with a content consumption session. For each of the plurality of content items, the system determines at least one respective actionable item based on the at least one attribute and on the profile information. The system causes to be displayed the landing interface, which includes a plurality of simultaneously displayed content item identifiers associated with the plurality of content items, respectively, and proximate to each of the displayed content item identifiers, causing to be displayed at least one respective actionable item identifier associated with the at least one respective actionable item, respectively.

18 Claims, 6 Drawing Sheets

(56) References Cited

U.S. PATENT DOCUMENTS

| | | | |
|---|---|---|---|
| 9,571,870 B1* | 2/2017 | Wilson | H04N 21/44222 |
| 9,762,971 B1* | 9/2017 | Dodge | H04N 21/4532 |
| 11,140,434 B1 | 10/2021 | Aher et al. | |
| 2005/0251827 A1 | 11/2005 | Ellis et al. | |
| 2008/0091796 A1* | 4/2008 | Story | H04L 65/403 |
| | | | 709/217 |
| 2009/0044246 A1* | 2/2009 | Sheehan | H04N 21/4622 |
| | | | 725/146 |
| 2009/0177989 A1* | 7/2009 | Ma | H04N 21/4312 |
| | | | 715/781 |
| 2011/0069940 A1* | 3/2011 | Shimy | H04N 21/47 |
| | | | 386/296 |
| 2011/0314495 A1* | 12/2011 | Zenor | H04N 21/25883 |
| | | | 725/34 |
| 2013/0036434 A1* | 2/2013 | Shkedi | H04N 21/4524 |
| | | | 725/14 |
| 2013/0211875 A1* | 8/2013 | Milman | G06Q 30/0201 |
| | | | 705/7.29 |
| 2014/0282061 A1* | 9/2014 | Wheatley | H04N 21/4332 |
| | | | 715/745 |
| 2015/0019332 A1* | 1/2015 | Roberts | G11B 27/28 |
| | | | 705/14.53 |
| 2015/0026706 A1* | 1/2015 | Leamon | H04N 21/251 |
| | | | 725/9 |
| 2015/0195621 A1* | 7/2015 | Harron | H04N 21/44222 |
| | | | 725/46 |
| 2015/0382071 A1* | 12/2015 | Aravamudan | H04N 21/812 |
| | | | 725/14 |
| 2016/0127783 A1* | 5/2016 | Garcia Navarro | H04N 21/4532 |
| | | | 725/34 |
| 2016/0127784 A1* | 5/2016 | Roberts | H04N 21/44218 |
| | | | 725/12 |
| 2017/0238055 A1* | 8/2017 | Chang | H04N 21/4662 |
| | | | 725/19 |
| 2017/0302979 A1* | 10/2017 | Kaya | H04N 21/482 |
| 2018/0152759 A1* | 5/2018 | Miller | G06F 16/2455 |
| 2018/0336415 A1* | 11/2018 | Anorga | G06K 9/6267 |
| 2019/0327526 A1* | 10/2019 | Navin | H04N 21/25891 |
| 2020/0007952 A1* | 1/2020 | Turner | H04N 21/84 |
| 2020/0074181 A1* | 3/2020 | Chang | G06F 3/011 |
| 2021/0400332 A1 | 12/2021 | Aher et al. | |

* cited by examiner

SYSTEMS AND METHODS FOR PROVIDING PERSONALIZED ACTIONABLE ITEMS FOR CONTENT ITEMS

CROSS-REFERENCE TO RELATED APPLICATIONS

This application is a continuation of U.S. patent application Ser. No. 16/861,768, filed Apr. 29, 2020 (now allowed). The disclosure of which is hereby incorporated by reference herein in its entirety.

BACKGROUND

The present disclosure relates to content output systems and, more particularly, to providing personalized actionable items for content items on a user interface.

SUMMARY

Systems and methods are described herein for providing personalized actionable items for content items on a user interface (UI). UI elements are generated and displayed on the UI for a corresponding content item, such as an episode of a television program or a movie. These UI elements include data and one or more actionable items related to the corresponding content item. For example, the data may include name/title of the movie, cast of the movie, duration of the movie, and other suitable information, or any combination thereof. Actionable items are selectable options that, when selected, cause a predefined action to be taken. Where a content item is a media content item such as a movie or television show, actionable items may include, for example, "Play," "Watch Trailer," "Add to Watchlist," any other suitable actionable item, or any combination thereof. Conventionally, actionable items are common among all the content items and do not vary for different content items. Moreover, actionable items are conventionally provided only upon selection of a content item causing a new display interface to be presented having information and selectable options related to the selected content item. Often some actionable items are buried under several layers of interfaces that need to be clicked through. Therefore, the user would need to manually browse or search through multiple screens to reach a desired actionable item Accordingly, the present disclosure provides the desired actionable item(s) for display on a landing interface of the UI. Specifically, the system receives a request to display a landing interface of a content guidance application. The system identifies a plurality of content items each of which is associated with at least one attribute. The system accesses profile information, which corresponds to a content consumption session during which the content guidance application is initiated. For each of the plurality of content items, the system determines at least one respective actionable item based on the at least one attribute and on the profile information. The actionable items for a first content item of the plurality of content items are different from actionable items of a second content item of the plurality of content items. The system causes to be displayed the landing interface, which includes a plurality of simultaneously displayed content item identifiers associated with the plurality of content items, respectively. The system further causes to be displayed proximate to each of the displayed content item identifiers, at least one respectable action item identifier associated with the respective actionable item.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are described herein for providing personalized actionable items for content items on a user interface (UI). Methods and systems are also described herein for generating the personalized actionable items for display on the UI.

As used herein, "a content guidance application" (CGA) is a type of application that utilizes functions to generate a landing interface/page; allows the user to navigate through the content items; obtain information on the content items and profile information; and generates actionable items personalized for the content items. The CGA further functions to perform the actionable items selected by the user. In one embodiment, the CGA utilizes attributes of content items and profile information of the user to provide actionable items customized for each of the content items. In one embodiment, the actionable items are provided for display on the landing interface of the CGA application.

In some embodiments, the CGA may be provided as an on-line application (i.e., provided on a website), or as a stand-alone application on a server, user device, etc. Various devices and platforms that may implement the CGA are described in more detail below. In some embodiments, the CGA and/or any instructions for performing any of the embodiments discussed herein may be encoded on a computer-readable medium. Computer-readable medium includes any capable of storing instructions and/or data. The computer-readable medium may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, card, register memory, processor caches, Random Access Memory ("RAM"), etc.

As referred to herein, the term "content item" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, playlists, electronic books, social media, applications, games, and/or any other media and/or combination of the same. Content may be recorded, played, displayed, or accessed by devices, but can also be part of a live performance.

Figure 1:
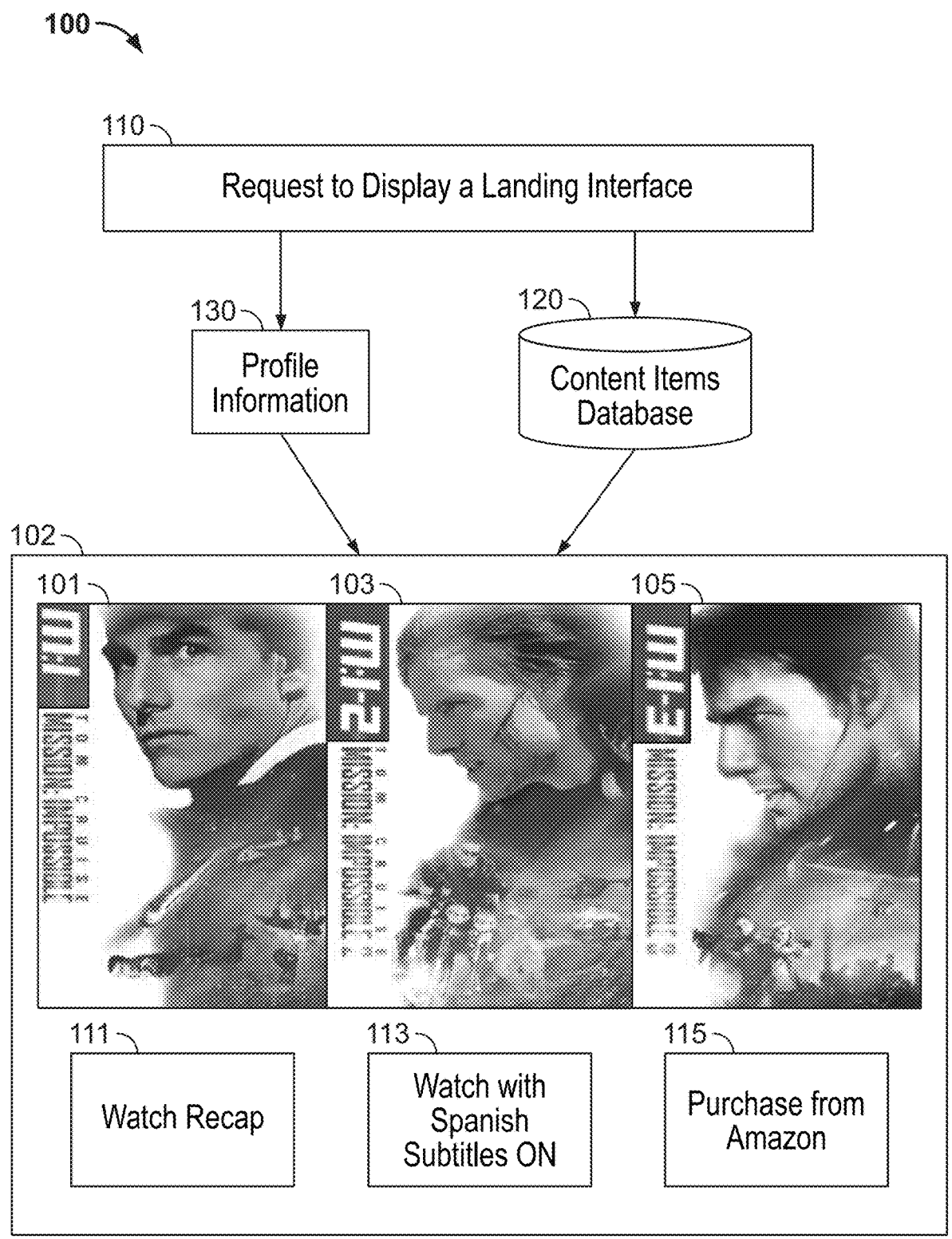
FIG. 1 shows an illustrative example of a content guidance application for displaying a landing interface on a user interface in accordance with some embodiments of the disclosure.
Figure 2:
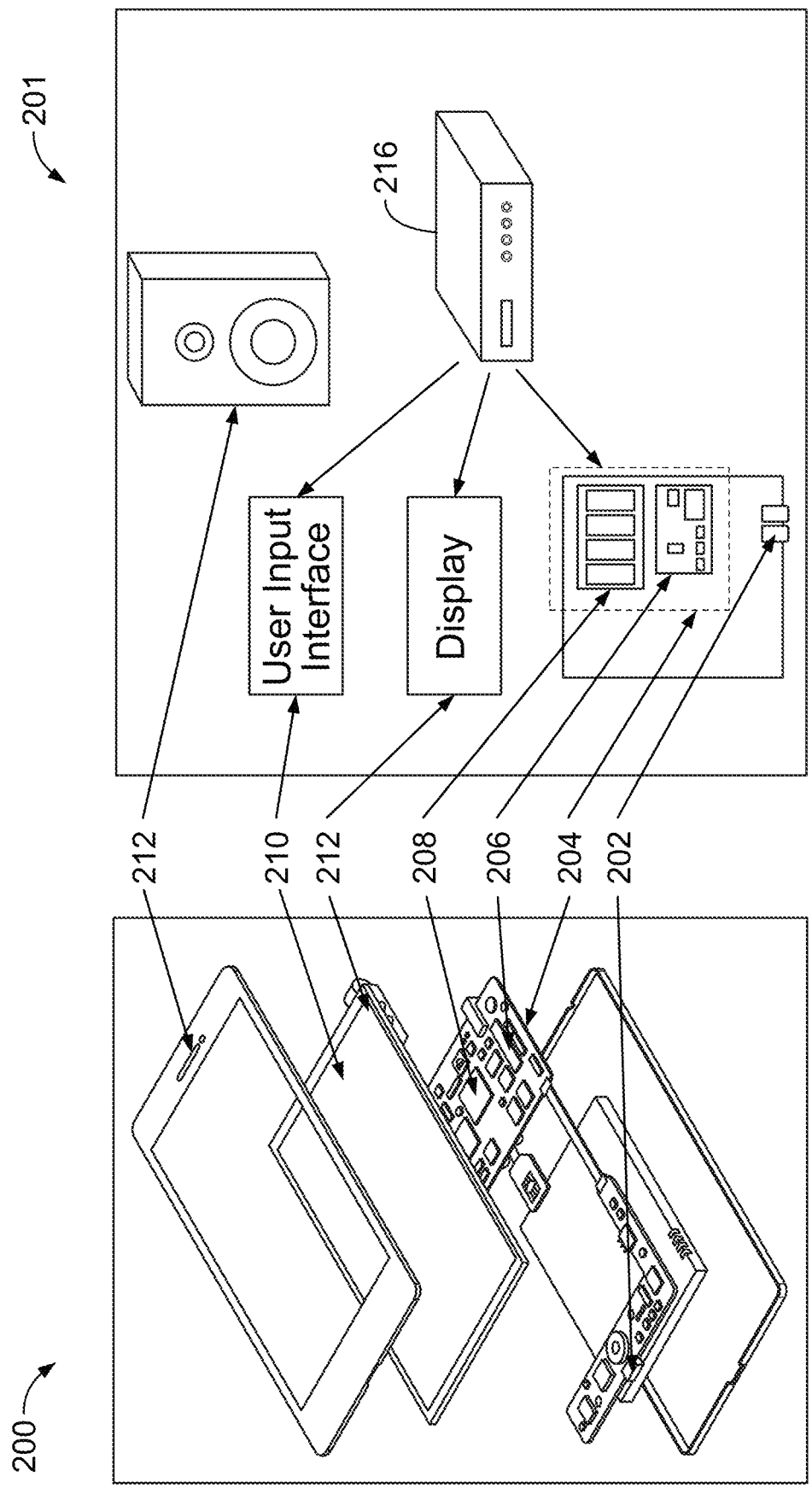
FIG. 2 is a block diagram of an illustrative content output system, in accordance with some embodiments of the disclosure.
Figure 3:
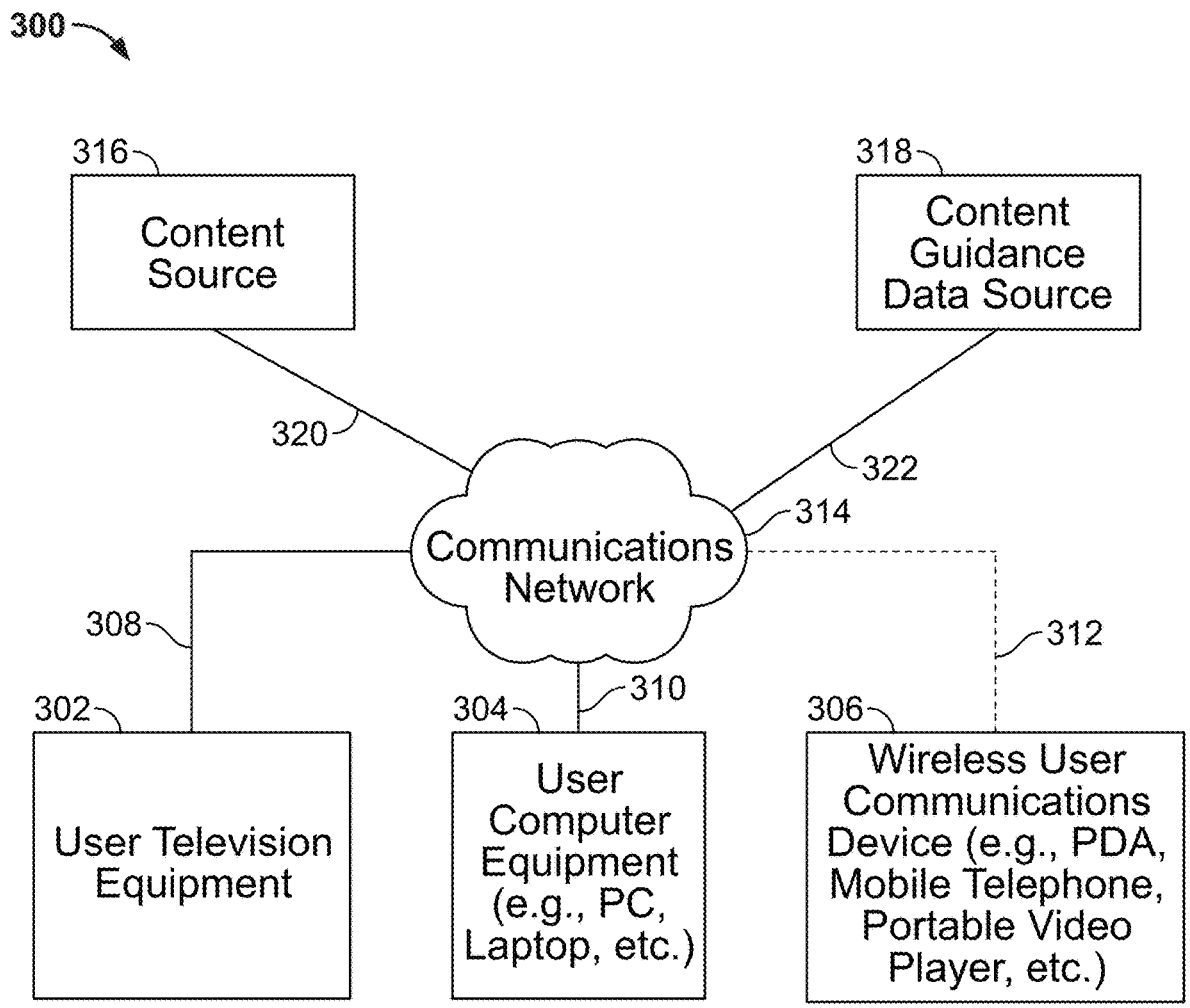
FIG. 3 is a block diagram of an illustrative device, in accordance with some embodiments of the disclosure.

FIG. 1 is an illustrative example of an operation of the CGA performed by e.g., control circuitry 204 (FIG. 2) for providing personalized actionable items for each of the content to a user in accordance with some embodiments of the present disclosure. In particular, FIG. 1 shows a scenario 100 where a request is received to display a landing interface 102 of the CGA on a UI at block 110. The UI is on a user's device, e.g., user television equipment, user computer equipment, and/or wireless user communication device (FIG. 3). The request is received by a user via, e.g., I/O path 204 (FIG. 2). The landing interface is an interface on a UI where a user arrives or lands when the user first reaches a site. In one embodiment, the landing interface of the CGA is for a content consumption session. The content consumption session is a time when the CGA is insinuated. In one example, the user insinuates the CGA by turning on the user's device. In one example, the user insinuates the CGA by selecting a "home" icon on the user's device. In one embodiment, a request for a search query related to a content item insinuates the CGA.

In some embodiments, the CGA accesses content items database 120 to identify content items. In one embodiment, the CGA identifies the content item based on a search criterion of the search query. For example, the search query is "Show me an action movie starring Tom Cruise." The CGA may identify movies of "Mission Impossible" as the content item. The content items database 120 includes content item metadata. The content item metadata includes content item identifiers, each of which uniquely identifies a respective content item among the content items. In one embodiment, the content item is a media content. The media content may include different types of content such as an audio, image, video, text, augmented reality (AR), visual reality (VR), etc. In one example, the content items include three results of the movie "Mission Impossible (MI)" are "MI 1, MI 2 and MI 3." In one example, the content item identifier includes text uniquely identifying each of first, second and third results respectively of the three MI movies. In another example, the content item identifier includes an image uniquely identifying each of the three MI movies. The image may include a specific character in a specific scene uniquely identifying each of the three MI movies. In a further example, the content item identifier includes a combination of the text and the image. For example, content item identifiers 101, 102 and 103 for each of the content items, MI 1, MI 2, and MI 3 movies respectively are illustrated in FIG. 1. The content item metadata also includes one or more attributes assigned to each of the respective content item. The attributes define available content options. Some examples of the attributes include "Recap," "Rent," "Purchase," "Language Subtitles," "Watch," "Play," "Pause," "Add to Watchlist," etc. In some embodiments, the content item metadata may also include rating, genre, age relevance etc. In some embodiments, the content items' metadata is updated. In one embodiment, the CGA modifies the content items metadata by deleting content item identifier(s) when corresponding content items are old content. In one embodiment, CGA modifies the content items' metadata by adding new content item identifier(s) upon availability of new content.

In one embodiment, the CGA accesses profile information 130 corresponding to the content consumption session. In one embodiment, the profile information is a user's profile data. The user's profile data may include preferences associated with a user. For example, user profile data may include content browsing history, user interaction history with different content items, prior content consumption, social media patterns, etc., utilized by the CGA to determine user preferences for particular types of content options. In one example, the user profile data may include one or more preferences for different content options such as "Rent" or "Purchase" for different content items. User profile data may also include predetermined profile preferences. In one embodiment, the user inputs the user profile preference(s). In one embodiment, the CGA determines the user profile preference(s). In some embodiments, the profile information is updated to reflect current user preferences.

In one embodiment, the CGA determines an actionable item based on the attribute of the content item and the profile information. In some embodiments, the CGA correlates the attribute of the corresponding content item with the profile information. Such correlation causes the CGA to determine an actionable item (pre-defined) for each of the content items. In one embodiment, the CGA identifies an attribute of a content item and correlates it with the profile information to determine an actionable item that is relevant to a specific content item. For example, the CGA identifies a "Recap" as one of the attributes for MI 1 movie and checks on the profile information to determine that the user had previously watched MI 1 movie about a year ago. The CGA correlates the "Recap" with the user having previously watched MI 1 movie. Accordingly, the CGA determines that the user may want to watch the recap of MI 1 movie as an actionable item. The CGA generates "Watch Recap" as an actionable item identifier 111 for the actionable item for MI 1 movie. In another example, the CGA identifies "Spanish Subtitles" as one of the attributes for MI 2 movie. In one embodiment, the CGA checks on the profile information to determine that the user having previously watched MI 1 movie in Spanish. The CGA correlates the "Spanish Subtitles" with the user having previously watched MI 1 movie in Spanish. Accordingly, the CGA determines that the user is most likely to watch MI 2 movie with Spanish Subtitles as the actionable item for MI 2 movie. The CGA generates "Watch with Spanish Subtitles ON" 113 as an actionable item identifier for the actionable item for MI 2 movie.

In one embodiment, the CGA dynamically generates the actionable item based on the attribute and the profile information. In one embodiment, the CGA checks on the profile information to determine that the user is fluent in Spanish. The CGA correlates the "Spanish Subtitles" with the user being fluent in Spanish. Accordingly, the CGA generates an actionable item, which checks with the user whether he/she wishes to watch the media asset in Spanish. For example, the CGA generates "Do you want to watch this in Spanish?" as the actionable item identifier for the generated actionable item for MI 2 movie.

In a further example, the CGA identifies "Purchase" is one of the attributes for MI 3 movie and checks on the profile information to determine that the user watched MI 1 movie after purchasing it from Amazon. The CGA correlates "Purchase" with the user watching MI 1 movie after purchasing it from Amazon. Accordingly, the CGA determines that the user may wish to purchase again from Amazon as an actionable item for MI 3 movie in order to watch MI 3 movie. The CGA generates "Purchase from Amazon" 115 as an actionable item identifier for the actionable item for MI 3 movie. Accordingly, each of the actionable items are different for each of the content items and customized to the respective content item.

In one embodiment, the CGA provides, for display on the landing interface 102, each of the content item identifiers corresponding to their respective content items. In one example, the content items identifiers 101, 103 and 105 for content items MI 1, MI 2 and MI 3 movies respectively, are displayed on the landing interface 102 illustrated in FIG. 1. In one embodiment, proximate to each of the displayed content item identifiers, the CGA provides for display the respective actionable item identifier corresponding to each of the respective actionable items on the landing interface 102. In one example, as illustrated in FIG. 1, the actionable item identifier "Watch Recap" 111 is displayed proximate to the content item identifier 101, the actionable item identifier "Watch with Spanish Subtitles ON" 113 is displayed proximate the content item identifier 103, and the actionable item identifier "Purchase from Amazon" 115 is displayed proximate the content item identifier 105 on the landing interface 102. As shown, each actionable item is different for each of the content items. Thus, the actionable items are customized for each content item and displayed on the landing interface 102 of the UI. Since the actionable items are displayed on the landing interfaces of the UI, the user need not navigate through various interfaces or select generic actionable item(s) in order to reach the actionable item for the content item that is relevant to the user. In this manner, the actionable item customized for the user is provided to the user right at the landing interface from the very beginning of the content consumption session.

In some embodiments, a user may select the actionable item identifier of the desired actionable item, which results in display of the corresponding content item identified by the content item identifier on another interface different from the landing interface. For example, when a touchscreen is being used, a user may press on the screen to select a desired actionable item. As another example, a user may navigate a cursor or pointer to a desired indicator (e.g., using arrow keys or a mouse) and press a button (e.g., a select button or a mouse button) to select it. Such an action may generate a signal that is received and interpreted by the CGA as a selection of the content item with its corresponding personalized actionable item. For example, if the user selects the "Watch with Spanish Subtitles ON" 113 for the content item identifier 103, the movie MI 2 movie with Spanish subtitles will be displayed on another interface of the UI.

Users may access content from one or more of their devices. FIG. 2 shows generalized embodiments of a device capable of presenting content on a display 212. The display 212 belongs to a smartphone, tablet, virtual reality headset, television, any electronic device for content consumption, or any suitable combination thereof. For example, display 212 may belong to a smartphone device. In another example, display 212 may belong to a user television equipment system. User television equipment system with display 212 may include a set-top box 216. Set-top box 216 may be communicatively connected to speaker 214 and display 212. In some embodiments, display 212 may be a television display or a computer display. In some embodiments, set top box 216 may be communicatively connected to user interface input 210. In some embodiments, user interface input 210 may be a remote control device. Set-top box 216 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of devices are discussed below in connection with FIG. 5. Each one of device 200 and user equipment system 201 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communication paths (described below). I/O functions may be provided by one or more of these communications path but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for an application stored in memory (e.g., storage 208). Specifically, control circuitry 204 may be instructed by the application to perform the functions discussed above and below. For example, the application may provide instructions to control circuitry 204 to monitor words spoken by a user and determine whether they match words in the content that is being output. In some implementations, any action performed by control circuitry 204 may be based on instructions received from the application.

In client-server based embodiments, control circuitry 204 may include communications circuitry suitable for communicating with a content application server or other networks or servers. The instructions for carrying out the above-mentioned functionality may be stored on the content application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of devices, or communication of devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU- RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein, including, for example, metadata including content item identifier and attribute(s) of the content item. Storage 208 may also be used to store the actionable item identifiers of the actionable items. Storage 208 may also be used to store screencaps of the related content items. Storage 208 may also be used to store memory size of the content items. Storage 208 may also be used to store profile information corresponding to the content consumption session. Storage 208 may further be used to store current bandwidth of a user's device on which to download and display the content item and the related content segments. Nonvolatile memory may also be used (e.g., to launch a boot-up routine and other instructions). Cloud-based storage, described in relation to FIG. 5, may be used to supplement storage 208 or instead of storage 208. In some embodiments, a database is accessible at the cloud-based storage, where the database stores metadata files of content, a look-up table mapping content segments or timestamped content to characteristics or related content segments, any suitable reference for control circuitry to retrieve when determining a characteristic of a current portion of content or related content segments, or any suitable combination thereof.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive content data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of each one of device 200 and user equipment system 201. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 212 may be HDTV-capable. In some embodiments, display 212 may be a 3D display, and the interactive application and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of each one of device 200 and user equipment system 201 or may be stand-alone units. The audio component of videos and other content displayed on display 212 may be played through speakers 214. In some embodiments, the audio may be distributed to a receiver (not shown), which processes and outputs the audio via speakers 214.

The content application may be implemented using any suitable architecture. For example, it may be a stand-alone application wholly-implemented on each one of device 200 and user equipment system 201. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210.

In some embodiments, the application is a client-server based application. Data for use by a thick or thin client implemented on each one of device 200 and user equipment system 201 is retrieved on-demand by issuing requests to a server remote to each one of device 200 and user equipment system 201. In one example of a client-server based content application, control circuitry 204 runs a web browser that interprets web pages provided by a remote server. For example, the remote server may store the instructions for the application in a storage device. The remote server may process the stored instructions using circuitry (e.g., control circuitry 204) and generate the displays discussed above and below. The client device may receive the displays generated by the remote server and may display the content of the displays locally on equipment device 200. This way, the processing of the instructions is performed remotely by the server while the resulting displays are provided locally on equipment device 200.

In some embodiments, the content application is downloaded and interpreted or otherwise run by an interpreter or virtual machine (run by control circuitry 204). In some embodiments, the content application may be encoded in the ETV Binary Interchange Format (EBIF), received by control circuitry 204 as part of a suitable feed, and interpreted by a user agent running on control circuitry 204. For example, the content application may be an EBIF application. In some embodiments, the content application may be defined by a series of JAVA-based files that are received and run by a local virtual machine or other suitable middleware executed by control circuitry 204. In some of such embodiments (e.g., those employing MPEG-2 or other digital media encoding schemes), the content application may be, for example, encoded and transmitted in an MPEG-2 object carousel with the MPEG audio and video packets of a program.

Each one of device 200 and user equipment system 201 of FIG. 2 can be implemented in system 300 of FIG. 3 as user television equipment 302, user computer equipment 304, wireless user communications device 306, or any other type of user equipment suitable for accessing content, such as a non-portable gaming machine. For simplicity, these devices may be referred to herein collectively as user equipment or devices and may be substantially similar to devices described above. Devices, on which an application may be implemented, may function as a standalone device or may be part of a network of devices. Various network configurations of devices may be implemented and are discussed in more detail below.

A device utilizing at least some of the system features described above in connection with FIG. 2 may not be classified solely as user television equipment 302, user computer equipment 304, or a wireless user communications device 306. For example, user television equipment 302 may, like some user computer equipment 304, be Internet-enabled allowing for access to Internet content, while user computer equipment 304 may, like some television equipment 302, include a tuner allowing for access to television programming. The application may have the same layout on various different types of user equipment or may be tailored to the display capabilities of the user equipment. For example, on user computer equipment 304, the content application may be provided as a web site accessed by a web browser. In another example, the content application may be scaled down for wireless user communications devices 306.

In system 300, there is typically more than one of each type of device but only one of each is shown in FIG. 3 to avoid overcomplicating the drawing. In addition, each user may utilize more than one type of device and also more than one of each type of device.

In some embodiments, a device (e.g., user television equipment 302, user computer equipment 304, wireless user communications device 306) may be referred to as a "second device." For example, a second device may provide an interface for adjusting settings and display preferences of the first device. In some embodiments, the second device is configured for interacting with other second devices or for interacting with a social network. The second screen device can be located in the same room as the first device, a different room from the first device but in the same house or building, or in a different building from the first device.

The user may also set various settings to maintain consistent application settings across in-home devices and remote devices. For example, if a user enables selection of related content segments on their personal computer at their office, this feature would also be enabled on the user's in-home devices (e.g., user television equipment and user computer equipment) as well as the user's mobile devices, if desired. Therefore, changes made on one device can change the content experienced on another device, regardless of whether they are the same or a different type of device. In addition, the changes made may be based on settings input by a user, as well as user activity monitored by the content application. In addition, two devices can work together to provide functionality for the user. For example, a first device can determine a current portion of the content being output to a user and instruct a second device to determine content segments related to the current portion of the content.

The devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the devices may be provided by one or more of these communications paths but are shown as a single path in FIG. 3 to avoid overcomplicating the drawing.

Although communications paths are not drawn between devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 502-11x, etc.), or other short-range communication via wired or wireless paths. BLUETOOTH is a certification mark owned by Bluetooth SIG, INC. The devices may also communicate with each other directly through an indirect path via communications network 314.

System 300 includes content source 316 and content data source 318 coupled to communications network 314 via communication paths 320 and 322, respectively. Paths 320 and 322 may include any of the communication paths described above in connection with paths 308, 310, and 312. Communications with the content source 316 and content data source 318 may be exchanged over one or more communications paths but are shown as a single path in FIG. 3 to avoid overcomplicating the drawing. In addition, there may be more than one of each of content source 316 and content data source 318, but only one of each is shown in FIG. 3 to avoid overcomplicating the drawing. If desired, content source 316 and content data source 318 may be integrated as one source device. Although communications between sources 316 and 318 with devices 302, 304, and 306 are shown as through communications network 314, in some embodiments, sources 316 and 318 may communicate directly with devices 302, 304, and 306 via communication paths (not shown) such as those described above in connection with paths 308, 310, and 312.

Content source 316 may include one or more types of content distribution equipment including a television distribution facility, cable system headend, satellite distribution facility, programming sources (e.g., television broadcasters), intermediate distribution facilities and/or servers, Internet providers, on-demand content servers, and other content providers. Content source 316 may be the originator of content (e.g., a television broadcaster, a Webcast provider, etc.) or may not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote content server used to store different types of content (including video content selected by a user), in a location remote from any of the devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content data source 318 may provide data related to the content. Content data may be provided to the devices using any suitable approach. In some embodiments, the content application may be a stand-alone interactive television program guide that receives program guide data via a data feed (e.g., a continuous feed or trickle feed). Program schedule data and other content data may be provided to the user equipment on a television channel sideband, using an in-band digital signal, using an out-of-band digital signal, or by any other suitable data transmission technique. Program schedule data and other content data may be provided to user equipment on multiple analog or digital television channels.

In some embodiments, content data from content data source 318 may be provided to user's equipment using a client-server approach. For example, a user equipment device may pull content data from a server, or a server may push content data to a user equipment device. In some embodiments, a content application client residing on the user's equipment may initiate sessions with source 318 to obtain content data when needed, e.g., when the content data is out of date or when the device requests the data. Content data may be provided to the user equipment with any suitable frequency (e.g., continuously, daily, a user-specified period of time, a system-specified period of time, in response to a request from user equipment, etc.). Content data source 318 may provide devices 302, 304, and 306 the application itself or software updates for the application.

In some embodiments, the content data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The content data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of less or more than one year. The content data may include a model (e.g., a survivor model) used for generating a score that indicates a likelihood a given user will terminate access to a service/source. For example, the application may monitor a user's engagement with content to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access. The content data may include metadata files pertaining to the content items e.g., attributes of the content items, characteristics of content portions, content item identifiers associated with respective content items; actionable item(s) for the content item and actionable item identifiers of the actionable items, screencaps of the content items; memory size of the content item. The content data may also include profile information, e.g., user profile data corresponding to content consumption session. The user profile data may be used to determine likelihood of the actionable item for the content item. The user profile data may be used to determine likelihoods of the user navigating away from or to a content portion or segment. For example, content data may include information characterizing content such as the director, producer, actors, activities occurring during the content, locations the content was created, any description of the content context or the content production, or any suitable combination thereof.

Applications may be, for example, stand-alone applications implemented on devices. For example, the application may be implemented as software or a set of executable instructions which may be stored in storage 208 and executed by control circuitry 204 of each one of device 200 and user equipment system 201. In some embodiments, applications may be client-server applications where only a client application resides on the device, and server application resides on a remote server. For example, applications may be implemented partially as a client application on control circuitry 204 of each one of device 200 and user equipment system 201 and partially on a remote server as a server application (e.g., content data source 318) running on control circuitry of the remote server. When executed by control circuitry of the remote server (such as content data source 318), the application may instruct the control circuitry to generate the content displays and transmit the generated displays to the devices. The server application may instruct the control circuitry of the content data source 318 to transmit data for storage on the device. The client application may instruct control circuitry of the receiving user equipment to generate the content displays.

Content and/or content data delivered to devices 302, 304, and 306 may be over-the-top (OTT) content. OTT content delivery allows Internet-enabled user devices, including any device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide content data described above.

Content output system 300 is intended to illustrate a number of approaches, or network configurations, by which devices and sources of content and content data may communicate with each other for the purpose of accessing content and providing the ability generate for simultaneous display the content item identifier associated with the content items and the actionable item identifiers associated with the actionable items personalized for the respective content items proximate their corresponding content item identifiers. The embodiments described herein may be applied in any one or a subset of these approaches, or in a system employing other approaches for downloading and displaying the content. The following four approaches provide specific illustrations of the generalized example of FIG. 3.

In one approach, devices may communicate with each other within a home network. Devices can communicate with each other directly via short-range point-to-point communication schemes described above, via indirect paths through a hub or other similar device provided on a home network, or via communications network 314. Each of the multiple individuals in a single home may operate different devices on the home network. As a result, it may be desirable for various content application information or settings to be communicated between the different devices. For example, it may be desirable for users to maintain consistent application settings on different devices within a home network, as described in greater detail in Ellis et al., U.S. Patent Publication No. 2005/0251827, filed Jul. 11, 2005. Different types of devices in a home network may also communicate with each other to transmit content. For example, a user may use content navigation button on one device while the content is transmitted to a second device to be generated for display.

In a second approach, users may have multiple types of user equipment by which they access content. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, timelines and the locations of the content item identifiers and their respective actionable item identifiers display enablement, or other settings) on the online content application to control the user's in-home equipment. The online application may control the user's equipment directly, or by communicating with an application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home can use their application to communicate directly with content source 316 to access content. Specifically, within a home, users of user television equipment 302 and user computer equipment 304 may access the application to navigate among and locate desirable content. Users may also access the application outside of the home using wireless user communications devices 306 to navigate among and locate desirable content.

In a fourth approach, devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources 316 and one or more content data sources 318. In addition, or in the alternative, the remote computing sites may include other devices, such as user television equipment 302, user computer equipment 304, and wireless user communications device 306. For example, the other devices may provide access to a stored copy of a video or a streamed video. In such embodiments, devices may operate in a peer-to-peer manner without communicating with a central server.

The cloud provides access to services, such as content storage, content sharing, or social networking services, among other examples, as well as access to any content described above, for devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a device to store content to the cloud and to receive content from the cloud rather than storing content locally and accessing locally-stored content.

Cloud resources may be accessed by a device using, for example, a web browser, an application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, devices can use cloud resources for processing operations such as the processing operations performed by processing circuitry described in relation to FIG. 2.

Any one or more of device 200 and user equipment system 201 of FIG. 2 and user television equipment 302, user computer equipment 304, and wireless user communications device 306 of FIG. 3 can be used to provide a thorough and efficient content consumption experience. For example, the devices of the present disclosure can generate for simultaneous display content item identifiers associated with the plurality of content items, respectively; and least one respective actionable item identifier associated with the at least one respective actionable item proximate to each of the content identifiers, respectively. Further details of the present disclosure are discussed below in connection with the flowcharts of FIGS. 4-6.

Figure 4:
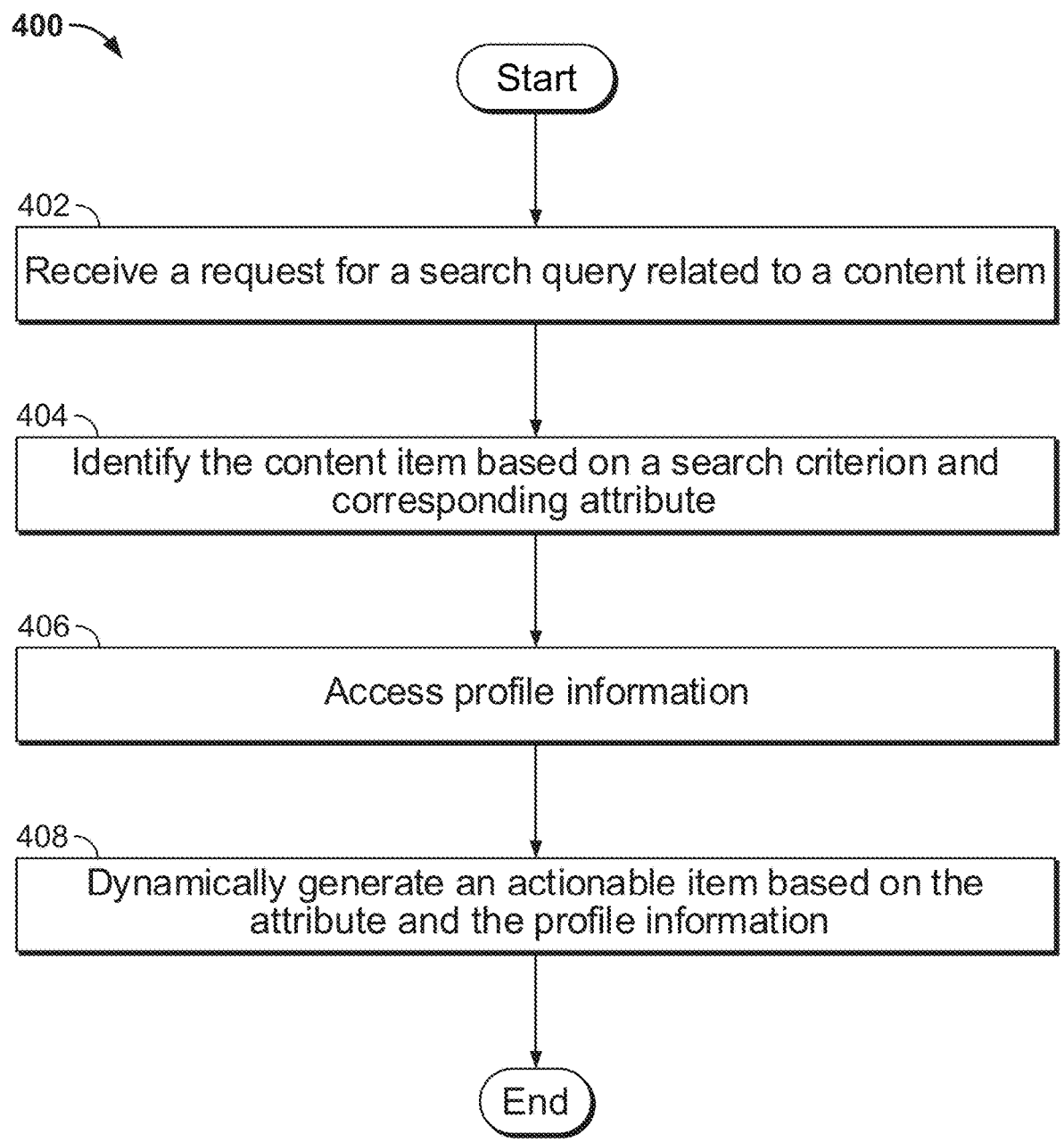
FIG. 4 shows an illustrative flowchart of a process for providing personalized actionable items for a content item, in accordance with some embodiments of the disclosure.

FIG. 4 depicts an illustrative flowchart of a process 400 for generating personalized actionable items for content items on a user interface, in accordance with some embodiments of the disclosure. It should be noted that the steps of process 400 can be performed by control circuitry 204 of FIG. 2. Control circuitry 204 may be part of a device having a display 212 (e.g., a device that may have any or all of the functionality of user television equipment 302, user computer equipment 304, and/or wireless communications device 306 of FIG. 3), part of a remote server separated from the user equipment by way of a communications network (e.g., communication network 314 of FIG. 3), or distributed over a combination of both.

At step 402, the system receives a request for a search query related to a content item. In one embodiment, the content item is a media content. As discussed above, in one example, the search query is "Show me an action movie starring Tom Cruise." The content items database 120 includes content item metadata. The metadata includes a content item identifier and attribute(s) corresponding to each content item. At step 404, the system identifies the content item based on a search criterion and a corresponding attribute. As discussed above, the attribute defines the content options. The system may identify movies of "Mission Impossible" as the content item and "Spanish Subtitles" as the attribute. At step 406, the system accesses a profile information. As discussed above, the profile information is a user's profile data, which include preferences associated with a user. In one example, the system accesses the user's profile data to determine that the user is fluent in Spanish. At step 408, the system dynamically generates an actionable item based on the attribute and the profile information. The CGA generates an actionable item, which checks with the user whether he/she wishes to watch the movie in Spanish. For example, the CGA generates "Do you want to watch this in Spanish?" as actionable item/actionable item identifier.

Figure 5:
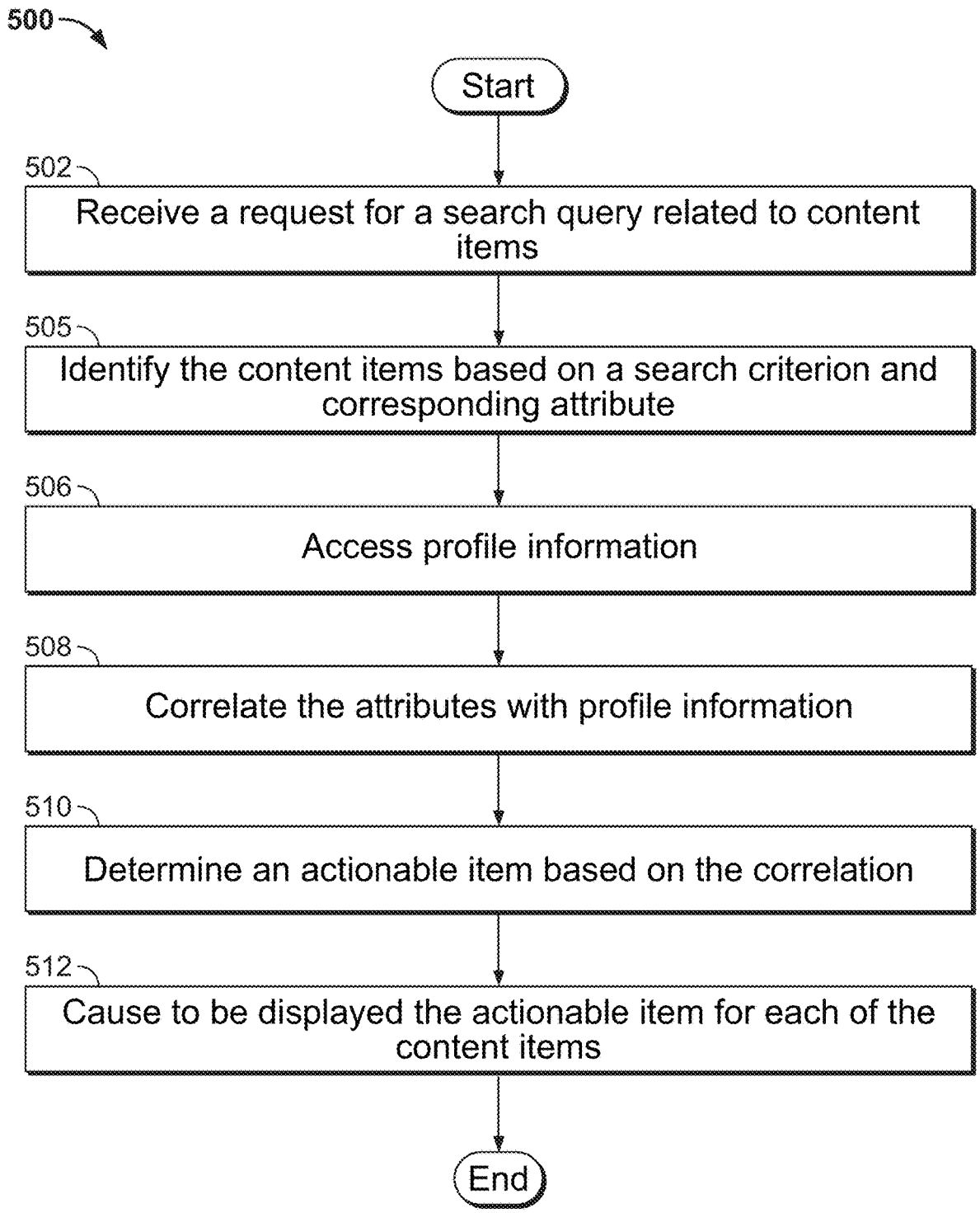
FIG. 5 shows another illustrative flowchart of a process for providing personalized actionable items for a content item, in accordance with some embodiments of the disclosure.

FIG. 5 depicts an illustrative flowchart of a process 500 for providing personalized actionable items for content items on a user interface, in accordance with some embodiments of the disclosure. It should be noted that the steps of process 500 can be performed by control circuitry 204 of FIG. 2. Control circuitry 204 may be part of a device having a display 212 (e.g., a device that may have any or all of the functionality of user television equipment 302, user computer equipment 304, and/or wireless communications device 306 of FIG. 3), part of a remote server separated from the user equipment by way of a communications network (e.g., communications network 314 of FIG. 3), or distributed over a combination of both.

At step 502, the system receives a request for a search query related to content items. In one embodiment, the content item is a media content. In one example, the search query is "Show all action movies starring Tom Cruise." The content items database 120 includes content item metadata. The metadata includes a content item identifier and attribute(s) corresponding to each content item. At step 504, the system identifies the content items based on a search criterion and corresponding attributes. As discussed above, the attribute defines the content options. The system may identify three MI 1, MI 2, and MI 3 movies of "Mission Impossible" as the content items and "Watch Recap," "Spanish Subtitles," and "Purchase" as the attributes, respectively. At step 506, the system accesses profile information. As discussed above, the profile information is a user's profile data, which include preferences associated with a user. In one example, the system accesses the user's profile data to determine that the user purchased the movie MI 1 movie on Amazon to watch it in Spanish about a year ago. At step 508, the system correlates the attributes with the profile information. For example, the system links the "Watch Recap" with the user having previously watched the movie MI 1. In another example, the system links "Spanish Subtitles" with the user having previously watched the MI 1 movie with Spanish subtitles. In a further example, the system links "Purchase" with user having previously purchased the MI 1 movie on Amazon. At step 510, the system determines actionable items based on the correlation. Accordingly, the system determines an actionable items to watch the recap for the MI 1 movie, to watch the movie MI 2 with Spanish subtitles and to purchase the MI 3 movie from Amazon. At step 512, the system causes to be displayed the actionable items for each of the content items. In one embodiment, the system causes to be displayed the actionable item identifiers (e.g., 111, 113 and 115 of FIG. 1) corresponding to the actionable items for each of the content items (e.g., 101, 103 and 105 of FIG. 1). The system causes to be displayed content on a display 212 including LCD and OLED displays used for mobile devices, 3D displays, video projectors, or any other suitable equipment for displaying visual images. Display is not limited to visual content, as content may have an audio and visual component or only one of either audio or visual components. Display may further include transmission of audio content for listening through a speaker 214 such as stereo speakers, headphones, portable speakers, or any other suitable device that outputs audio.

Figure 6:
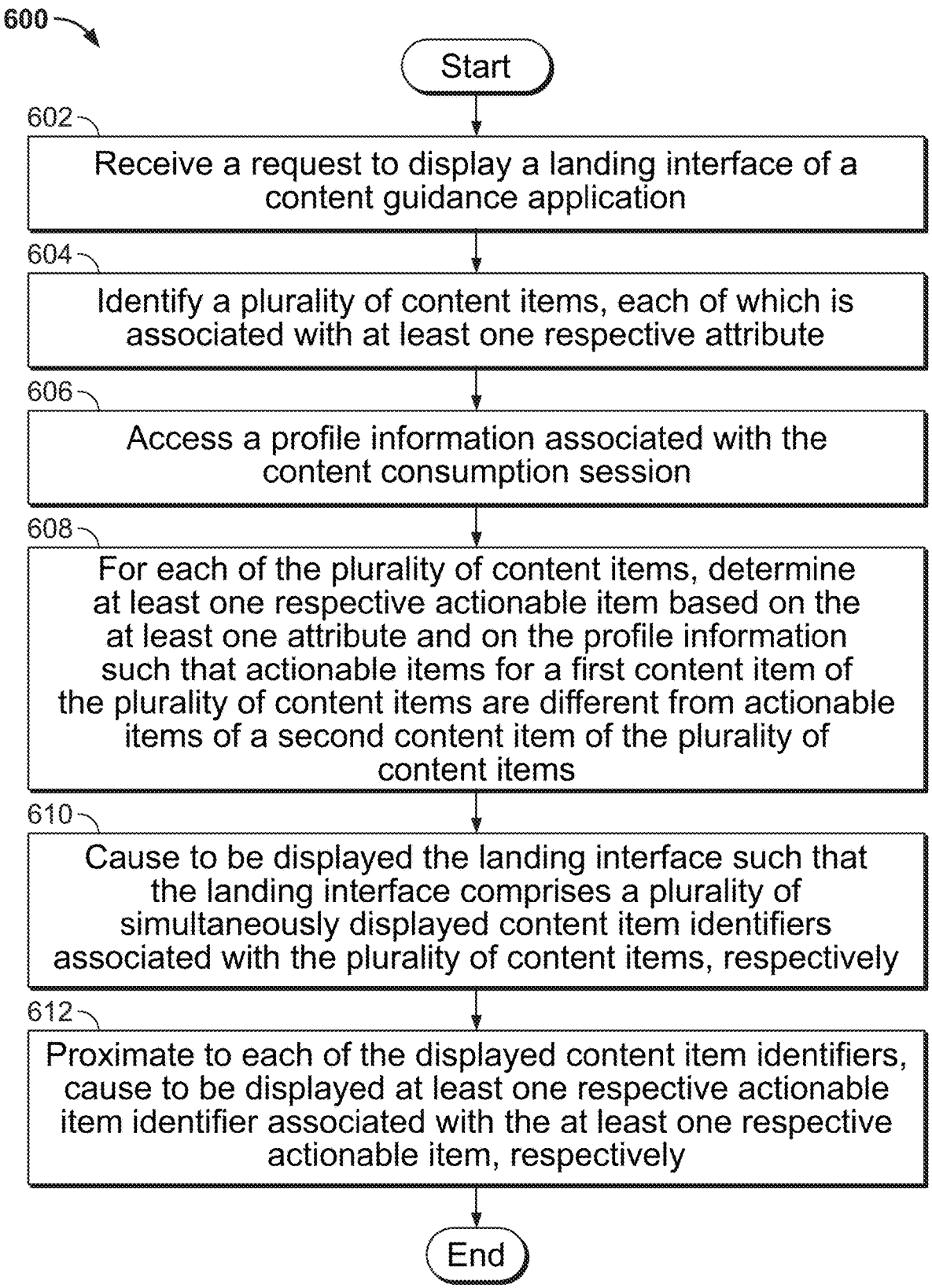
FIG. 6 shows an illustrative flowchart of a process for generating personalized actionable items for the content item in accordance with some embodiments of the disclosure.

FIG. 6 depicts an illustrative flowchart of a process 600 for providing personalized actionable items for content items on a user interface, in accordance with some embodiments of the disclosure. It should be noted that the steps of process 600 can be performed by control circuitry 204 of FIG. 2. Control circuitry 204 may be part of a device having a display 212 (e.g., a device that may have any or all of the functionality of user television equipment 302, user computer equipment 304, and/or wireless communications device 306 of FIG. 3), part of a remote server separated from the user equipment by way of a communications network (e.g., communications network 314 of FIG. 3), or distributed over a combination of both.

At step 602, the system receives a request to display a landing interface of a content guidance application. As discussed above, the landing interface is an interface on a UI where a user arrives or lands when the user first reaches a site. At step 604, the system identifies a plurality of content items, each of which is associated with at least one attribute. As discussed above, the attribute defines the content options. In one example, plurality of content items is different MI 1, MI 2, MI 3 iterations of the movie "Mission Impossible" (MI) as illustrated and discussed above with respect to FIG. 1. Each of the MI movies has a respective attribute. For example, attribute of the MI 1 movie is "Watch Recap", the attribute of the for MI 2 movie is "Spanish subtitles" and the attribute of MI 2 movie is "Purchase from Amazon." At step 606, the system accesses profile information associated with the content consumption session. As discussed above, the profile information is user profile data which provides preferences of the user. In one example, the user profile data includes that the user purchased MI 1 movie from Amazon to watch it about a year ago with Spanish subtitles.

At step 608, for each of the plurality of content items, the system determines at least one respective actionable item based on the at least one attribute and on the profile information. The actionable items for a first content item of the plurality of content items are different from actionable items of a second content item of the plurality of content items. So, for the example discussed above, the system determines that for the MI 1 movie, the user will like to watch the recap; for MI 2 movie, the user may like to watch it in Spanish subtitles; and for MI 3 movie, the user may like to purchase it from Amazon.

At step 610, the system causes to be displayed the landing interface including a plurality of simultaneously displayed content item identifiers associated with the plurality of content items, respectively. For example, the content identifiers 101, 103 and 105 are generated for MI 1, MI 2 and MI 3 movies respectively, as shown in FIG. 1. At step 612, proximate to each of the displayed content item identifiers, the system causes to be displayed at least one respective actionable item identifier associated with the at least one respective actionable item, respectively. For example, the actionable item identifiers 111, 113 and 115 are displayed proximate to the content item identifiers 101, 103 and 105, respectively, as shown in FIG. 1. The system causes to be displayed content on a display 212 including LCD and OLED displays used for mobile devices, 3D displays, video projectors, or any other suitable equipment for displaying visual images. Display is not limited to visual content, as content may have an audio and visual component or only one of either audio or visual components. Display may further include transmission of audio content for listening through a speaker 214 such as stereo speakers, headphones, portable speakers, or any other suitable device that outputs audio.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method comprising:
    determining that profile information associated with an account indicates: (a) that a first content item was previously consumed, and (b) a manner in which the first content item was previously consumed, wherein the manner in which the first content was previously consumed comprises one or more of playing with concurrent subtitles the content item, playing a recap of the content item, renting the content item, or purchasing the content item;
    identifying a second content item as being related to the first content item;
    in response to the identifying the second content item, determining based on the profile information associated with the account that the second content item is available to be played when requested in association with the account;
    in response to the determining that the second content item is available to be played when requested in association with the account and in response to the determining the manner in which the first content item was previously consumed, selecting a consumption option as an actionable item for the second content item, wherein the consumption option includes the manner in which the first content item was previously consumed; and
    causing to be displayed:
        an interface comprising a display of an identifier of the second content item and an indication of the consumption option as the actionable item for the second content item proximate to the second content item.

2. The computer-implemented method of claim 1, wherein the manner in which the first content item was previously consumed comprises a first language in which the first content item was previously consumed and a concurrent display of subtitles in a second language during consumption of the first content item, and wherein causing to be displayed the consumption option comprises causing to be displayed an identification of the first language in which the second content item will be consumed and displaying an identification of subtitles in the second language for concurrent display with the second content item.

3. The computer-implemented method of claim 1 further comprising, prior to consumption of the first content item, determining a manner in which the first content item will be consumed based on the profile information.

4. The computer-implemented method of claim 3, further comprising, prior to consumption of the first content item, causing to be displayed on the interface, the first content item and a first consumption option as an actionable item for the first content item, wherein the first consumption option includes the determined manner in which the first content item will be consumed.

5. The computer-implemented method of claim 4, wherein the manner in which the first content item will be consumed comprises a language in which the first content item will be consumed, and wherein determining the manner based on the profile information comprises determining that the profile information indicates that a user is fluent in the language.

6. The computer-implemented method of claim 4, wherein the manner in which the first content item will be consumed comprises a language of subtitles to be displayed concurrently with the first content item, and wherein determining the manner based on the profile information comprises determining that the profile information indicates that the user is fluent in the language.

7. The computer-implemented method of claim 1, wherein each of the plurality of content items is associated with at least one respective attribute and wherein the second content item is selected based on the at least one respective attribute corresponding to the second content item.

8. A system comprising:
    a memory storing profile information;
    control circuitry configured to:
        determine that profile information associated with an account indicates: (a) that a first content item was previously consumed, and (b) a manner in which the first content item was previously consumed, wherein the manner in which the first content was previously consumed comprises one or more of playing with concurrent subtitles the content item, playing a recap of the content item, renting the content item, or purchasing the content item;

identify a second content item as related to the first content item;

in response to the identifying the second content item, determine based on the profile information associated with the account that the second content item is available to be played when requested in association with the account; and in response to the determining that the second content item is available to be played when requested in association with the account and in response to the determining the manner in which the first content item was previously consumed, select a consumption option as an actionable item for the second content item, wherein the consumption option includes the manner in which the first content item was previously consumed; and input/output circuitry configured to cause to be displayed:
an interface, wherein the interface comprises a display of an identifier of the second content item; and
the consumption option as the actionable item for the second content item proximate to the second content item.

9. The system of claim 8, wherein the manner in which the first content item was previously consumed comprises a first language in which the first content item was previously consumed and a concurrent display of subtitles in a second language during consumption of the first content item, and wherein input/output circuitry is configured to, when causing display to be the consumption option, cause to be displayed an identification of the first language in which the second content item will be consumed and displaying an identification of subtitles in the second language for concurrent display with the second content item.

10. The system of claim 8, wherein the control circuitry is further configured to, prior to consumption of the first content item, determine a manner in which the first content item will be consumed based on the profile information.

11. The system of claim 10, wherein the input/output circuitry is further configured to, prior to consumption of the first content item, cause to be displayed on the interface, the first content item and a first consumption option as an actionable item for the first content item, wherein the first consumption option includes the determined manner in which the first content item will be consumed.

12. The system of claim 11, wherein the manner in which the first content item will be consumed comprises a language in which the first content item will be consumed, and wherein the control circuitry is further configured to, when determining the manner based on the profile information, determine that the profile information indicates that a user is fluent in the language.

13. The system of claim 11, wherein the manner in which the first content item will be consumed comprises a language of subtitles to be displayed concurrently with the first content item, and wherein the control circuitry is further configured to, when determining the manner based on the profile information, determine that the profile information indicates that the user is fluent in the language.

14. The system of claim 8, wherein each of the plurality of content items is associated with at least one respective attribute and wherein the control circuitry is configured to select the second content item based on the at least one respective attribute corresponding to the second content item.

15. A computer-implemented method comprising:
determining that profile information associated with an account indicates: (a) that a first content item was previously watched, and (b) a manner in which the first content item was previously watched;
identifying a second content item as being related to the first content item;
in response to the identifying of the second content item, determining based on the profile information associated with the account that the second content item is available to be played when requested in association with the account;
in response to both the determining that the second content item is available to be played when requested in association with the account and the determining the manner in which the first content item was previously watched, selecting a watch option as an actionable item for the second content item, wherein the selected watch option includes the manner in which the first content item was previously watched; and
causing to be displayed:
a user interface comprising a display of an identifier of the second content item and an indication, proximate the second content item, of the selected watch option as the actionable item for the second content item.

16. The computer-implemented method of claim 15, wherein the manner in which the first content was previously watched comprises one or more of playing with concurrent subtitles the content item, playing a recap of the content item, renting the content item, or purchasing the content item.

17. The computer-implemented method of claim 15 further comprising, prior to the watching of the first content item, determining a manner in which the first content item will be watched based on the profile information.

18. The computer-implemented method of claim 17, wherein the manner in which the first content item will be watched comprises a first language of subtitles displayed concurrently with the playing of the first content item with audio in a second language, and
wherein the indication of the watch option as the actionable item for the second content item comprises an identification of the first language.

* * * * *